United States Patent [19]

Pratt

[11] Patent Number: 4,953,053
[45] Date of Patent: Aug. 28, 1990

[54] METHOD AND APPARATUS FOR DETECTING MECHANICAL OVERLOAD OF A HOIST

[75] Inventor: Richard L. Pratt, Springfield, Ohio

[73] Assignees: Harnischfeger Corporation, Brookfield, Wis.; Yaskawa Electric Mfg. Co. Ltd., Tokyo, Japan

[21] Appl. No.: 304,757

[22] Filed: Jan. 31, 1989

[51] Int. Cl.5 .............................................. H02H 7/08
[52] U.S. Cl. ......................................... 361/31; 361/87; 318/465; 318/476
[58] Field of Search .................... 367/93, 31; 318/798, 318/800–803, 806, 807–812, 98, 650, 449–450, 453, 465, 469, 476; 361/23, 30–31, 78, 87, 88–89, 91–94

[56] References Cited

U.S. PATENT DOCUMENTS

| | | | |
|---|---|---|---|
| 3,912,976 | 10/1975 | Sons et al. | 361/3 F |
| 4,286,303 | 8/1981 | Gernheimer et al. | 361/31 |
| 4,288,828 | 9/1981 | Kuntner et al. | 361/31 |
| 4,291,355 | 9/1981 | Dinger | 361/34 |
| 4,306,265 | 12/1981 | Kuntner et al. | 361/31 |
| 4,363,061 | 12/1982 | Vaerewyck et al. | 361/31 |
| 4,481,553 | 11/1984 | Owen et al. | 361/93 |
| 4,623,967 | 11/1986 | Naimer | 361/93 |
| 4,763,220 | 8/1988 | Belbel et al. | 361/93 |
| 4,827,369 | 5/1989 | Saletta et al. | 361/93 |

Primary Examiner—William M. Shoop, Jr.
Assistant Examiner—David Martin
Attorney, Agent, or Firm—Richard C. Ruppin

[57] ABSTRACT

A hoist for raising and lowering objects with an apparatus for detecting mechanical overload of the hoist. The system provides a hoist having an alternating current motor connected to an alternating current power supply. The level of current of the power supplied to the motor is compared to a level of power indicative of a mechanical overload condition. If the current signal representative of the actual motor current level equals or exceeds the mechanical overload reference current then an overload output signal is provided.

12 Claims, 5 Drawing Sheets

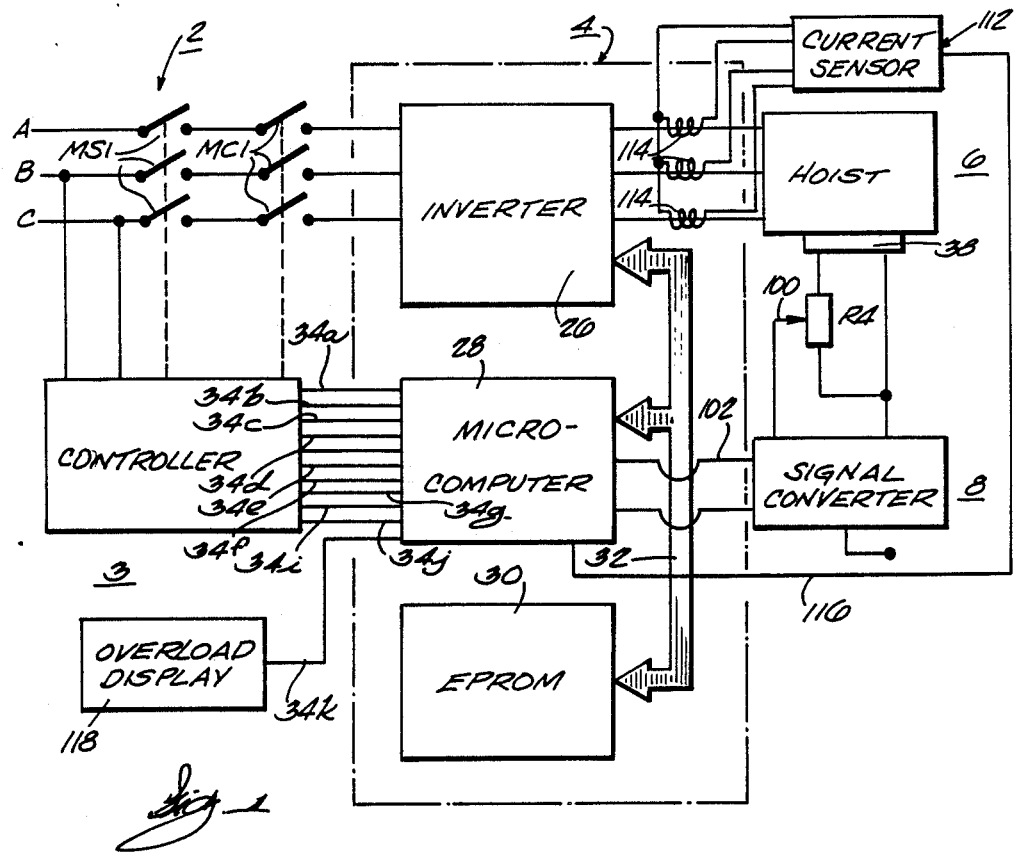
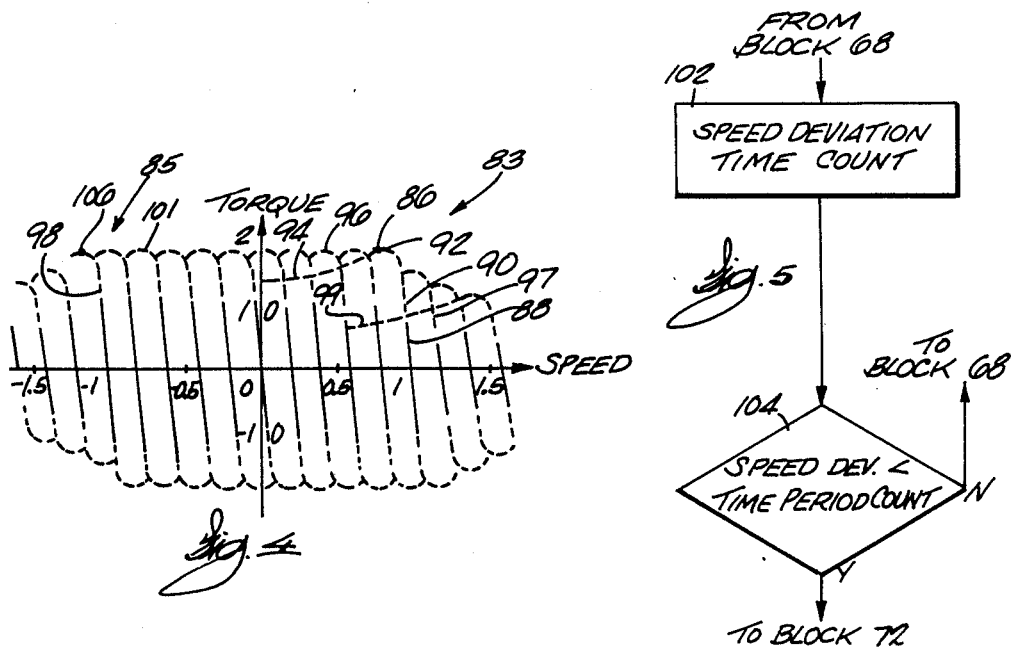

METHOD AND APPARATUS FOR DETECTING MECHANICAL OVERLOAD OF A HOIST

FIELD OF THE INVENTION

This invention relates to alternating current drive systems in which it is desired to prevent mechanical overloading. More particularly, the invention relates to detecting and preventing mechanical overload of hoists having adjustable frequency drive systems.

BACKGROUND OF THE INVENTION

Mechanical overloading of hoists occurs frequently in their regular everyday operation. Often, frequent overloading is overlooked in an effort to avoid operation and production delays. Nevertheless, mechanical overloading is undesirable whether it occurs inadvertently or as a routine, intentional practice. Hoists and cranes incorporating hoists typically have mechanical overload monitoring devices which sense mechanical strain on the hoist. In these devices, a strain sensor is placed in engagement with the hoist apparatus at a location which may, for example, be the most critical mechanical stress area of the hoist. An output signal from the strain sensor indicative of an overload is fed to the hoist control and used to provide an overload indication and possibly prevent further operation of the hoist. Typically, several relays and their contacts are operated in order to utilize the output signal from the strain sensor. An example of one type of mechanical strain overload monitoring device has a load cell located in contact with the dead end of the wire rope of the hoist at the location of the rope attachment to the hoist frame. The load cell produces an output signal indicative of the strain produced in the rope by the weight of the load object raised and carried or lowered by the hoist.

Alternating current adjustable frequency drives for various types of motor applications have been in use for some time. More recently, adjustable frequency motor drives have been developed for hoist applications, however, due to exacting load control requirements required by hoists, various problems with adjustable frequency drives have prevented their wide spread use. One problem with adjustable frequency drives has been their lack of reliability in producing the necessary torque to control the load at the initiation of hoist operation. A recently developed solution to this problem involves the maintaining of the hoist brake engaged at the beginning of motor operation, applying power from the adjustable frequency drive at a low frequency only sufficient to produce the current and thereby the torque necessary to control the load on the hoist when the brake is released, and releasing the brake only after the necessary current level is detected.

The above described approach has made adjustable frequency drive systems far more reliable in their load controlling ability at the initiation of hoist operation, however, further development of adjustable frequency drive systems to provide them with additional characteristics and reliability is desirable to make them competitive with other types of drive systems. One of these desirable characteristics is the ability to detect mechanical overloading of the hoist.

SUMMARY OF THE INVENTION

It is a general object of this invention to provide, in a hoist for raising and lowering objects, an improved method and apparatus for detecting mechanical overload of the hoist. It is a further object of the invention to provide a relatively simple method and apparatus for detecting mechanical overload of a hoist utilizing the sensing of the level of the current supplied to the hoist motor.

The invention is carried out by providing a hoist having an alternating current motor connected to an alternating current power supply. The level of the current of the power supplied to the motor which is indicative of a mechanical overload condition of the hoist is determined. Current measuring means coupled to the power supply measures the actual level of the current supplied to the motor and produces a signal indicative of the measured current level. An overload reference means provides a reference signal representative of the motor current level indicative of the mechanical overload condition. Comparison means compares the current signal representative of the motor current level and the reference signal. If the current signal representative of the actual motor current level equals or exceeds the reference signal, an overload output signal is provided.

Current levels representative of different mechanical overload conditions of the hoist for a raising operation and a lowering operation of the hoist can also be determined. The overload current reference means then provides overload reference signals corresponding to each of the motor current levels indicative of a different mechanical overload condition of the hoist. The comparison means is responsive to a signal indicating whether the hoist is raising or lowering the object. The comparison means is responsive to the raising or lowering signal to compare the signal representative of the motor current level with the corresponding overload reference signal corresponding to either the raising or lowering operation of the hoist.

The hoist motor can be supplied with power from an adjustable frequency power supply so that its speed can be increased or decreased by correspondingly varying the frequency of the power supply from one frequency value to another. When motor speed increases or decreases, the torque of the motor and therefore the motor current level also increases and decreases. Thus, during a speed increase or decrease corresponding to a frequency increase or decrease, the increased current level may be merely an indication of motor speed change and not an accurate indication of mechanical overload of the hoist. Consequently, means is provided for sensing whether the frequency of the power supply to the motor is at a constant value or is increasing or decreasing and only if the frequency sensing means produces a signal indicating that the frequency is constant, is the comparison means permitted to compare the signal representative of the actual motor current level and the reference signal representative of a mechanical overload condition of the hoist.

It may be possible that the mechanical overload condition is of a temporary nature and, if so, it is desirable that operation of the hoist not be interrupted. If this type of situation is of concern, a time delay period may be provided which provides a predetermined delay before the comparison means operates to compare the signal representative of the motor current level on the overload reference signal and produce the overload output signal.

BRIEF DESCRIPTION OF THE DRAWINGS

Further objects and advantages of the invention will appear when taken in conjunction with the accompanying drawings, in which:

FIG. 1 is a schematic diagram of an adjustable frequency drive apparatus according to the invention;

FIG. 4 is a graph of torque versus frequency curves of a squirrel cage alternating current motor;

FIG. 5 is a sequence flow chart illustrating the operation sequence of an alternate embodiment of the invention;

DETAILED DESCRIPTION OF THE INVENTION

Figure 2:
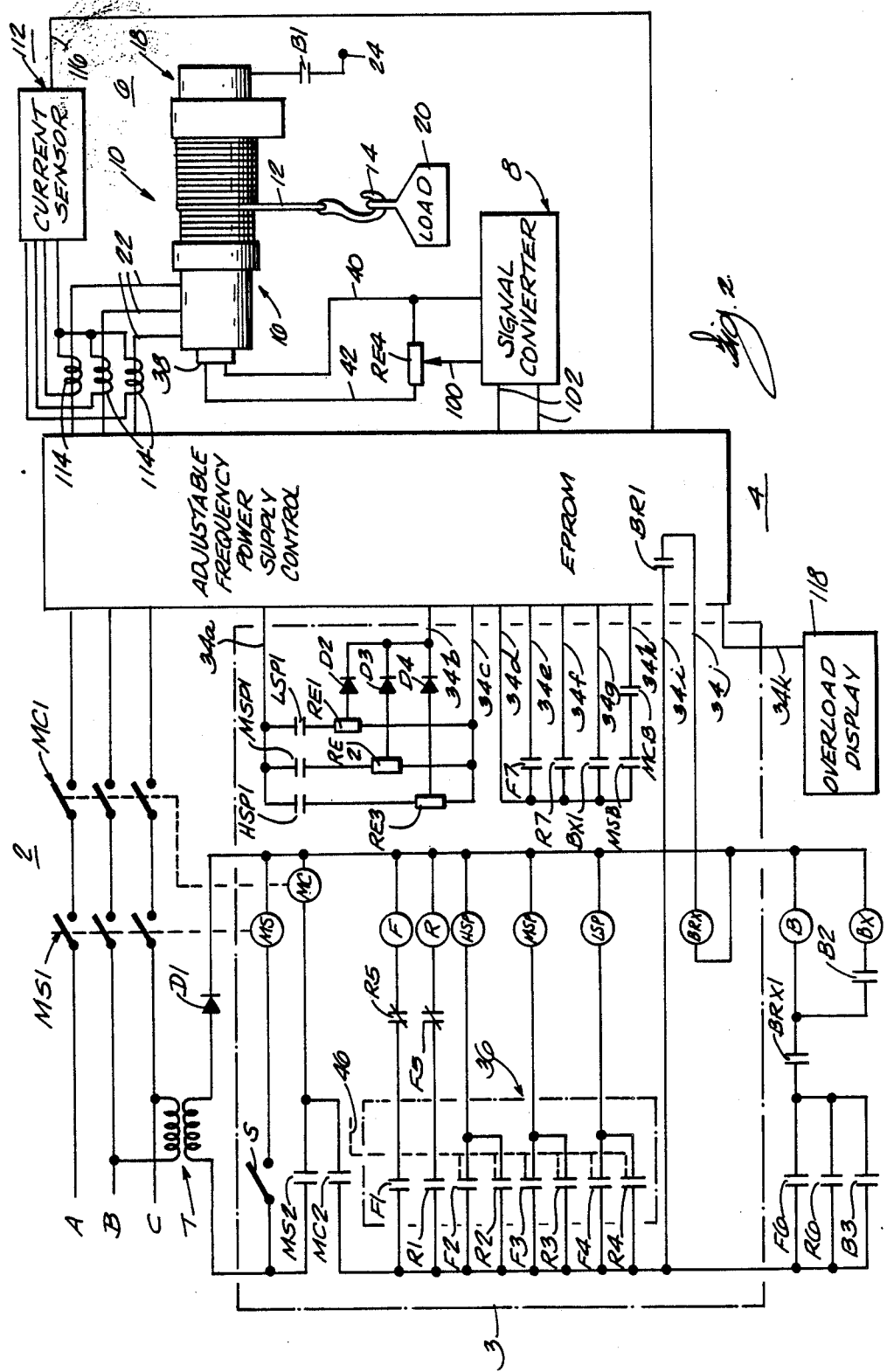
FIG. 2 is a more detailed circuit diagram of the drive apparatus illustrated in FIG. 1.

Referring generally to FIGS. 1 and 2, switch means 2 is illustrated which includes main switch contacts MS1 and main circuit contacts MC1 for providing three phase, 60 hertz power from lines A, B and C to an adjustable frequency power supply 4 which, in turn, provides power to a hoist 6. A d.c. power supply is provided to a controller 3 through transformer T connected across lines B and C and a diode D1. A signal converter 8 is connected between the hoist 6 and the adjustable frequency power supply 4 for use in motor rotation direction and speed deviation detection purposes. With reference to FIG. 2, the hoist 6 comprises a drum 10, a motor 16 which drives the drum 10, and an electromagnetic brake 18 for stopping or holding the drum 10. A cable 12 having a hook 14 at its lower end is affixed to the drum 10 and may be wound onto or paid out from the drum 10 to lower or raise an object such as load 20 carried by the hook. The motor 16 is preferably a three phase squirrel-cage induction type which may, for example, have a rated synchronous speed of 1200 rpm at 60 hertz. An alternating current three phase power supply is provided to the motor 16 on lines 22 from the adjustable frequency power supply 4. The motor 16 drives the drum 10 through gear means (not shown) in a rotational direction to either wind the cable 12 onto the drum 10 and raise the load 20 or pay the cable 12 out from the drum 10 and lower the load 20. The rotational direction of the motor 16 and thereby the raising or lowering of the load 20 is determined by the phase sequence of the three phase power supply on the lines 22. The electromagnetic brake 18 is connected to an a.c. or d.c. power source at terminal 24 through a contact B1 which controls the release of the brake 18. The brake 18 operates to stop and hold the drum 10 from rotating to thereby hold the load 20 suspended when the motor 16 is not operating to raise or lower the load. A spring (not shown) within the brake 18 applies the brake and the brake is released by an electromagnetic force when the contact B1 closes. The brake 18, drum 10 and motor 16 are all well known devices and will not be further described herein except as necessary to described the instant invention.

The adjustable frequency power supply 4 includes an inverter 26, a microcomputer 28 and an EPROM 30, all connected together by a bus 32. Information in digital signal form is transferred between the microcomputer 28, EPROM 30 and inverter 26 on the bus 32. The microcomputer 28 is also connected to the controller 3 via lines 34a-34j for transmitting information signals directing the control of the microcomputer 28 and the controller 3 and to an overload display 118 via line 34k. The microcomputer 28 includes a microprocessor, a memory, and input and output units which are well-known types of devices and are not shown, and which receive or transmit information on the bus 32, the lines 34a-34j and the lines 102 and process and convert from one form to another the information received to provide control instructions to the inverter 26, EPROM 30, Signal converter-8 and controller 3 for the operation of the hoist 6.

The EPROM 30 contains a program for controlling the operation of the hoist 6 in conjunction with signals received by the microcomputer 28 from the controller 3, the signal converter 8, and the inverter 26. The inverter 26 receives a three phase 60 hertz power input from the lines A, B, and C as previously stated. The output of the inverter 26 is a three phase selectively variable frequency output $F_{out}$ on the lines 22 to the motor 16. The inverter 26 is of a well known type in which the three phase power input is rectified to full wave direct current power and then converted to three phase alternating current power output at a constant voltage to frequency ratio and at a frequency which may be varied and controlled by input signals from the microcomputer 28. The phase sequence of the alternating current power supply on lines 22, which controls the direction of rotation of the drum 10, is directed by a signal from the controller 3 to the microcomputer 28, as will be discussed in greater detail hereinafter.

The controller 3 includes a master switch 36 having an operating lever shown schematically and designated by the numeral 46 in FIG. 2. Movement of the lever 46 causes contacts F1-F4 and R1-R4, which comprise part of the switch 36, to be placed in an open or closed condition. In identifying circuit components related to hoist movement herein, the letter "F" generally relates to the forward or upward movement direction of the hoist 6 and load 20 and the letter "R" refers to the reverse or downward movement direction of the hoist 6 and load 20. The controller 3 also includes forward solenoid coil F and its contacts F5-F7, reverse solenoid R and its contacts R5-R7, low speed solenoid coil LSP and its switch LSP1, medium speed solenoid coil MSP and its switch MSP1, high speed solenoid coil HSP and its switch HSP1, solenoid coil BX and its contact BX1, and solenoid coil BRX and its contact BRX1. Components which also may be considered as part of the controller 3 are switch S, main switch coil MS, and its auxiliary contacts MS2 and MS3, main contactor coil MC1 and its auxiliary contacts MC2 and MC3, brake solenoid coil B and its contacts B1-B3, resistors RE1-RE3, and diodes D2-D4. The contacts F1 and R5 are serially contacted to the forward solenoid coil F and the contacts R1 and F5 are serially connected to the reverse solenoid coil R. The contacts F2 and R2 are connected in parallel and together in series with the high speed solenoid coil HSP. The contacts F3 and R3 are connected in parallel and together in series with the medium speed solenoid coil MSP. The contacts F4 and R4 are connected in parallel and together in series with the low speed solenoid coil LSP. All of the foregoing series circuits through a solenoid coil are connected across the d.c. control voltage of the controller 3. The contacts F6 and R6 and also a contact B3 of the brake solenoid B are connected in parallel and together in series with the contact BRX1 and the brake coil B. The contact B2 of the coil B and the solenoid coil BX are connected in series and together in parallel with the coil B. The coil BX provides a confirmation or answer-back signal indicating brake release and will be discussed in greater detail hereinafter. As illustrated in FIG. 2, the parallel combination of contacts F6, R6, and B3 in series with the BRX1 contact and the parallel combination of coil B and serially connected contact B2 and coil BX, are all connected in series across the d.c. control voltage of the controller 3. A brake release contact BR1 or equivalent device is located within the microcomputer 28 and is connected in series with the auxiliary brake release solenoid coil BRX across the d.c. control voltage of the controller 3. Contacts F7, R7, BX1 and the series combination of contacts MS3 and MC3 are respectively connected through lines 34e, 34f, 34g and 34h and in common through line 34d to terminals of the microcomputer 28. The contacts LSP1, MSP1 and HSP1 are respectively connected in series to variable resistors RE1, RE2 and RE3 and in parallel together through lines 34a and 34c across a d.c. supply voltage provided at the terminals of the microcomputer 28. A variable tap connection from each of the resistors RE1, RE2 and RE3 is respectively connected through diodes D2, D3 and D4 to an input terminal of the microcomputer 28.

With reference to the signal converter 8, a d.c. tachometer generator 38 is mounted on the motor 16 and connected via lines 40 and 42 to the signal converter. A divider resistor RE4 provides a variable tap connection through line 100 to the signal converter 8 for adjusting the input signal from the tachometer to the desired level. The signal converter 8 has an analog output signal to the microcomputer 28 which is representative of the speed, direction of rotation, and steady speed, accelerating, or decelerating mode, of the motor 16.

Figure 3A:
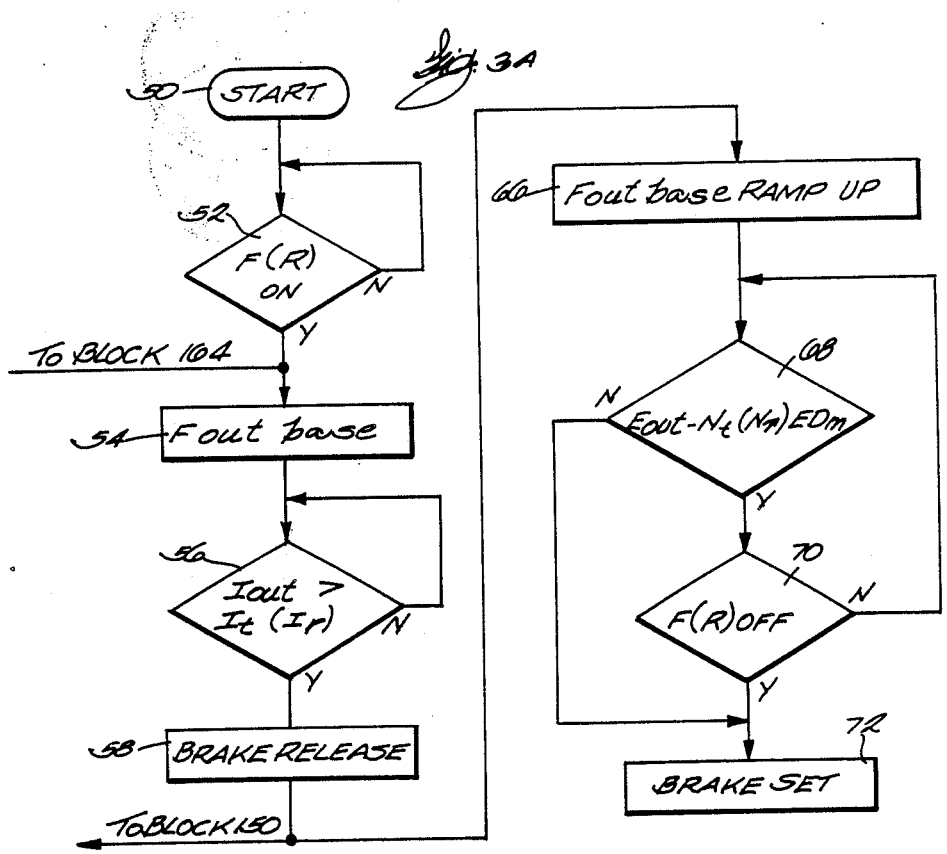
FIGS. 3A and 3B are sequence flow charts illustrating the operation sequence of the apparatus shown in FIGS. 1 and 2.

Operation of the apparatus is initiated by closing switch S which causes energization of the coil MS and the closing of the main contacts MS1 in lines A, B and C and the auxiliary contacts MS2 and MS3. Closing of the MS2 contact energizes coil MC to cause closing of the contacts MC1 and the auxiliary contacts MC2 and MC3. Direct current control power is thus provided through the MS2 and MC2 contacts from the transformer T and diode D1 to the controller 3. Alternating three phase power is also provided through the contacts MS1 and MC1 to inverter 26. With reference to FIG. 3A, the apparatus is now in the start mode indicated by block 50 due to the closed position of contacts MS3 and MC3. Assuming that the desired initial operation of the apparatus is to lift or hoist the load 20 at a low speed, the operating lever 46 of master switch 36 is moved from an off position to a low speed forward position of the switch 36. More specifically, this movement of the lever 46 closes the contact F1 to energize the coil F so that normally closed contact F5 is opened and normally open contacts F6 and F7 are closed. Opening of contact F5 prevents reverse operation of the hoist 6 until the lever 46 is returned to the off position. Closing of contact F7 provides an indication to the microcomputer 28 that the three phase output on lines 22 is to be in a forward phase sequence. With reference to FIG. 3A, the question of whether either a forward or reverse operation is being requested is determined by the microcomputer 28 as shown by the decision block 52 containing the letter "F" designating forward and the letter "R" designating reverse. If a forward or reverse operation is not being requested, the microcomputer loops the operating sequence back to make the determination again. If a forward or reverse operation is being requested, the operating sequence moves on to block 54. Movement of the operating lever 46 to the low speed forward direction also closes normally open contact F4 which causes energization of the LSP coil and thus closing of the LSP1 contact. Closing of the LSP1 contact provides an input signal to the microcomputer 28 indicating that the desired hoist drive frequency of the three phase output on the lines 22 is the frequency for a low speed of the motor 16 as indicated by the portion 47a of the graph shown in FIG. 8A.

Upon indication of the operation of the hoist 6, when the brake 18 is in a holding condition, it is important as previously discussed that the motor 16 be able to produce sufficient torque to control the load 20 prior to releasing of the brake 18. In order to ensure that such load control will be maintained, before operation or rotation of the motor 6 to raise or lower the load 20 begins, power must be supplied from the inverter 26 to the motor 16 at a minimum low frequency and at a current level such that a predetermined motor torque is produced that will hold the load 20 stationary or prevent the motor and load from moving in a direction opposite to that intended until after the brake 18 is released.

In view of the minimum frequency requirement of the power supply to the motor 16 at the start of operation of the hoist 6, if the master switch 36 is requesting either a forward or reverse hoist operation and the operating sequence therefore moves on to block 54 shown in FIG. 3A, the microcomputer 28 provides a signal on bus 32 to the inverter 26 to produce alternating current power at a low frequency on lines 22 to the motor 16. This frequency is the minimum frequency required to produce a desired predetermined holding torque at the initiation of the hoist operation and before release of the brake 18. The predetermined torque should be that torque level which will maintain load control under all expected loading conditions. This low frequency value of $F_{out}$ is designated $F_{out\ base}$ in the function block 54 of FIG. 3A.

Following the generation of power at the $F_{out\ base}$ frequency on the lines 22 by the inverter 26, the level of the output current $I_{out}$ on the lines 22 continuously is sensed and an appropriate digital indicating signal is conveyed to the microcomputer 28 on bus 32. The microcomputer 28 compares the signal representative of the value of $I_{out}$ with a signal representative of a reference forward current value $I_f$ or a signal representative of a reference reverse current value $I_r$ depending on whether the master switch 36 is requesting forward or reverse operation and thus whether contact F7 or contact R7 is closed. The values of $I_f$ and $I_r$ represent the lowest current values which will produce the necessary load controlling torque both at the start of hoist operation. If the value of $I_f$ or $I_r$ is greater than the value of $I_{out}$, than the sequence will loop back and be repeated, as shown in the decision block 56 of FIG. 3A. If any problem exists in the power supply 4 or hoist 6 that prevents the producing of the necessary level of $I_{out}$, the looping will repeat continuously and the brake 18 will continue in its holding condition and the hoist 6 will not be permitted to attempt operation. If the value of $I_{out}$ is greater than the value of $I_f$ or $I_r$, than a brake release operation will take place as indicated in block 58 of FIG. 3A. After release of the brake, the operation sequence moves on to increasing or ramping up the output frequency on lines 22 from the $F_{out\ base}$ level up to the output frequency $F_{out}$ as indicated in block 66 of FIG. 3A. This ramping up of the frequency to $F_{out}$ is required to meet the low speed request previously made by the master switch 36 and places the hoist 6 in a run condition.

At the initiation of operating the hoist 6, the hoist speed request may be either at low speed in accord with the foregoing description or the operation may be initiated at medium speed or high speed requiring higher frequency levels. In starting the raising of the hoist at medium or high speed, the operation of controller 3 is similar to starting at low speed except that the lever 46 is moved past the contact F4 closure location to the contact F3 or F2 closure position to energize either solenoid MSP or solenoid HSP. Also, either the MSP1 or the HSP1 auxiliary contact will be closed rather than the LSP1 contact. Therefore the signal to the microcomputer 28 will request that the inverter 26 be directed by the microcomputer 28 to increase or ramp up the frequency from $F_{out\ base}$ directly to the $F_{out}$ value required respectively for either the medium speed or high speed hoist operation.

In the event that the load 20 or the hook 14 without a load is in an elevated position and the initial operation of the hoist is to be in the reverse or lowering direction, the operation of the controller 3, power supply 4 and hoist 6 is similar to the operation of the apparatus in the forward direction except as noted hereinafter. Thus, in hoist operation in a lowering direction, contacts R1, R6 and R7 are closed, contact R5 is opened, and one of contacts R4, R3 or R2 is closed. The other contacts and solenoid coils associated with the controller 3, power supply 3 and hoist 6 function in the same manner during both raising and lowering operations. In FIG. 3A, the (R) in block 52 and the ($I_r$) in block 56 indicate that the sequence steps are carried out in the reverse operation direction.

Figure 3B:
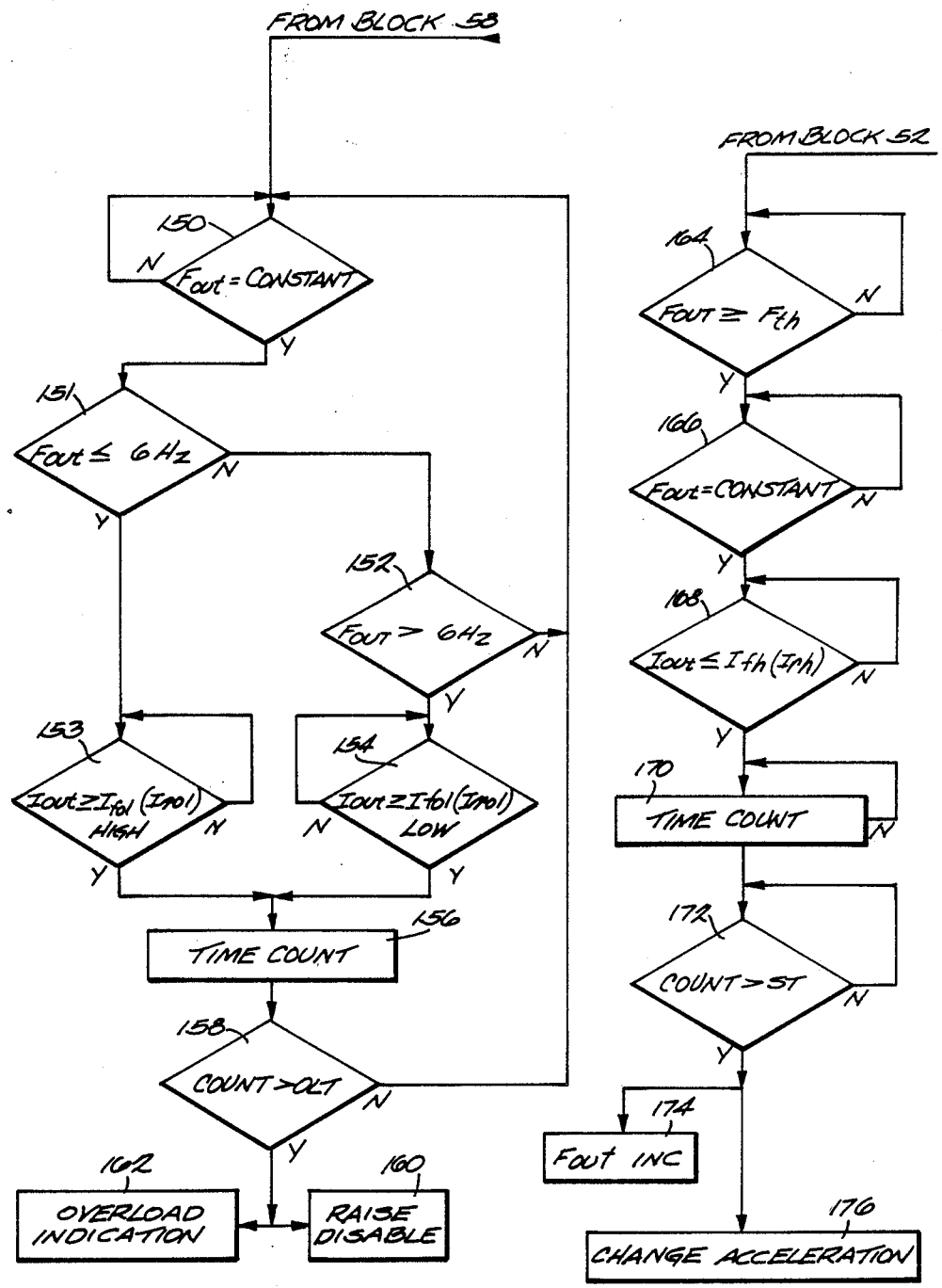

Upon a forward or raise request or a reverse or lower request from the master switch 36, a mechanical overload detection sequence is begun and continues during the operation of the hoist 6. Mechanical overloading of the hoist, of course, is undesirable in that it leads to a shorter operating life of the hoist, high maintenance costs, and possible danger in its operation if an overloaded component breaks at a critical time. Mechanical overload detection of the hoist 6 utilizes measurement of the current level of the power supply from the inverter 26 on the lines 22 to the hoist motor 16 and a comparison with a reference current level as indication of mechanical overload. With reference to FIGS. 1 and 2, a current sensor 112 is coupled to each one of the lines 22 by coils 114 to sense the current level and produce a low voltage d.c. output signal to the microcomputer 28 representative of the actual current level on line 116. The microcomputer 28 also receives a signal on bus 32 from the inverter 26 representative of the frequency $F_{out}$ of the power supply on lines 22 and determines from the frequency signal whether the frequency is a constant value or is changing such that the motor is in an accelerating or decelerating mode. With reference to FIGS. 3A and 3B, if the determination is made at block 52 in the operating sequence that a hoist forward or reverse operation is being requested, and the operation proceeds to the release of the brake 18 as depicted at block 58, with respect to overload detection, the operating sequence moves on to decision block 150.

Decision block 150 depicts the determination by the microcomputer 28 of whether the frequency $F_{out}$ is at a constant value by continuously comparing a present value of frequency $F_{out}$ with an immediately preceding value of frequency $F_{out}$. Thus, the microcomputer 28, on the basis of the signal received from the inverter 26, determines whether the frequency $F_{out}$ being supplied to the motor 16 is at a constant value or is changing, for example, from a previous constant value to another value required for a change in motor speed. If the output frequency is not constant the sequence will loop back and the comparison will again be made at block 150. In sensing mechanical overload of the hoist 6 utilizing the frequency $F_{out}$ of the power supply to the hoist motor 16, it is necessary that the frequency $F_{out}$ not be changing. This is a requirement since a high current level that could result in a mechanical overload indication will be supplied when the motor is operating at high torque and changing frequency to increase speed in raising a load or decrease speed in lowering a load. High current during such acceleration or deceleration conditions does not normally indicate an overload that it is desired to detect. By requiring that mechanical overload be sensed only during constant frequency conditions, a false mechanical overload condition due to motor speed increasing or decreasing is eliminated.

If the frequency $F_{out}$ is constant, the operation sequence moves on to determine whether the constant frequency $F_{out}$ is at a relatively low or high value. At low values of frequency $F_{out}$, the motor rated full load torque slip frequency can exceed the frequency $F_{out}$ or have a value so close to that of frequency $F_{out}$ that full load torque cannot be developed. In order to decrease the amount of slip required to produce full load torque, increased voltage is applied to the motor to, in turn, generate a higher current and consequently a higher torque level. In using motor current as a measure of overload, therefore, the inverse relationship of frequency and current must be considered. This is accomplished in the instant invention by determining a low value of frequency $F_{out}$ below which the motor current must be significantly increased to provide full load rated torque at a low slip angle. A motor current of a relatively high value is then selected as a reference current level indicative of mechanical overload when the frequency $F_{out}$ is at or below the low value. Correspondingly, a motor current of a relatively low value is selected as a reference current level indicative of mechanical overload when the frequency $F_{out}$ is above the low value. It has been found that a suitable low value of the frequency $F_{out}$ for mechanical overload detection purposes is 6 hertz. However, this low value of frequency $F_{out}$ may vary for different motors and it is not intended that the value be limited to 6 hertz.

Referring again to FIG. 3B, in determining whether frequency $F_{out}$ is at a low or high value, a comparison is first made at block 151 as to whether frequency $F_{out}$ is less than or equal to the low value 6 hertz. If not, the sequence moves to block 152 where the comparison is made as to whether frequency $F_{out}$ is greater than 6 hertz. If the frequency $F_{out}$ is not greater than 6 hertz, the sequence loops back to block 150 where the determination of whether frequency $F_{out}$ is constant is again made. If the result of the comparison at block 151 is positive the sequence moves to block 153 rather than block 152. If the result of the comparison at block 152 is positive the sequence moves to block 154.

Block 153 and 154 respectively depict the comparison of reference values of current for the low frequency and high frequency situations with output current from the inverter 26 to the motor 16 for both forward and reverse directions of the hoist 6 which are indicative of mechanical overload of the hoist. These reference currents are designated $I_{fol\ high}$ for the forward overload current and $I_{fol\ high}$ and $I_{rol\ low}$ for the high and low reverse overload current. The current levels $I_{fol\ high}$, $I_{rol\ high}$ and $I_{rol\ low}$, $I_{rol\ low}$ can be selected to be indicative of whatever mechanical overload of the hoist system is believed to be the most prudent value. If certain components of the hoist mechanical system are know to fail when the hoist is operated at a certain overload condition too frequently, that overload condition can be the basis for the reference current values. Different mechanical overload levels may also be utilized, for example, in the raising operation and lower operation of the hoist, mechanical stresses may be less during a lowering operation as compared to a hoist raising operation. Since the microcomputer 28 receives from the controller 3 on lines 34e and 34f an indication whether the hoist is to be operated in a raising or in a lowering operating mode, the microcomputer 28 can select the reference current values depicted at block 152 and these values may differ.

In the comparisons made at blocks 153 and 154, if the actual output current $I_{out}$ is not equal to or greater than the reference current values indicative of mechanical overload, the sequence loops back and the comparison is repeated.

If $I_{out}$ does equal or exceed the reference current level with which it is compared, indicating that a mechanical overload condition of the hoist system exists, it is desirable that the operation of the hoist not be affected by the overload condition if the overload is of a temporary nature. Accordingly, from block 153 or 154, the sequence moves to block 156 depicting a time count used in a time delay decision block 158. Block 158 depicts the comparison of a preselected overload time delay period OLT provided by the EPROM 30 to the microcomputer 128 with the time count depicted in block 156. If the time count is less than the time delay period OLT, the sequence is looped back to block 150 where the overload detection sequence is again initiated. The looping back to bloc 150 will continue until the time count exceeds the time delay, unless the level of the $I_{out}$ current drops to a value less than that of the reference overload current values, in which case the time count in the function block 156 will be reset to zero. If the level $I_{out}$ current continues to be equal to or greater than the reference current levels, the time count will continue to increment during each step through the mechanical overload operating sequence loop and, when the time count exceeds the time delay period, as depicted at block 158, the sequence moves to function blocks 160 and 162. Block 160 depicts a disabling of the hoist in a raising direction and block 162 depicts an overload indication. As may be appreciated, other functions or output signals may be provided as a result of the overload indication of decision block 158. As illustrated in FIGS. 2 and 3B, the overload indication results in a signal on line 34k to an overload display.

Upon the determination that a hoist forward or reverse operation is being requested as depicted at block 52 in FIG. 3A, in addition to moving onward in the operating sequence to the first step in determining whether sufficient motor torque will be available to hold the load upon release of the brake, as depicted by function block 54 in FIG. 3A, and also moving onward to detect any mechanical overload condition as depicted at block 150 of FIG. 3B, the operating sequence moves to decision block 164 in FIG. 3B, which depicts the initial step in an operation sequence permitting the hoist to operate at an increased speed. The controller 3 and power supply 4 typically operate to provide a maximum frequency of 60 hertz to the motor 16 of the hoist 6 at the rated full load of the motor. However, if the motor 16 is raising or lowering an empty hook or a relatively light load, for example, a load requiring only 25% or less of motor torque and a corresponding 25% or less of full load rated current, the frequency of the power supply on lines 22 to the motor 16 can be increased to increase the speed of the motor to a preselected higher speed. A high speed raising or lowering of the operation of the hoist 6 is highly desirable, in that it permits a rapid movement when the hook 14 is empty or the load 20 is small to significantly increase the productivity of the hoist.

With reference to FIG. 3B, decision block 164 depicts the step of comparing the actual frequency $F_{out}$ of the power supply on lines 22 connected to the motor 16, with a threshold reference frequency $F_{th}$. The frequency $F_{th}$ is provided to the microcomputer 28 from the EPROM 30, and is a preselected reference frequency below which it is desired that the hoist 6 not be able to have its speed increased to the increased speed operation mode. The reference frequency $F_{th}$ can be selected at any frequency of the power supply less than 60 hertz, since 60 hertz is the normal maximum frequency supplied by the power supply to the motor 16.

Figure 8A:
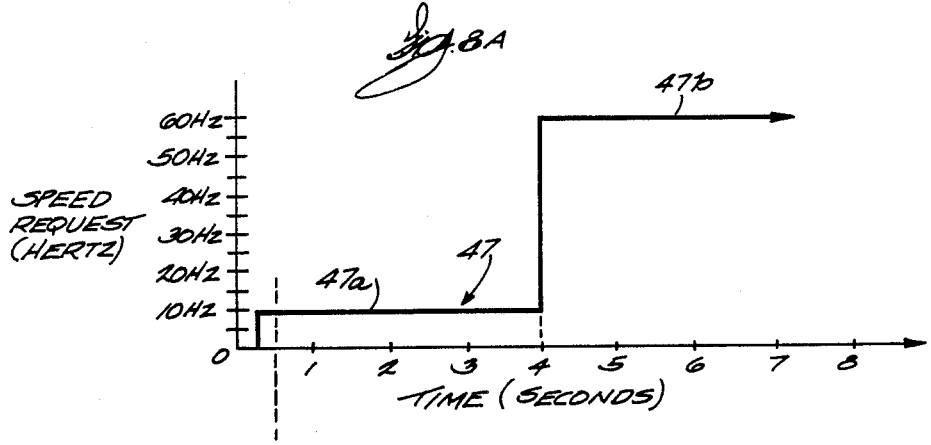
FIGS. 8A, 8B and 8C are graphs relating to the increased speed capability of the motor and hoist and respectively illustrate graphs of speed requested versus time, frequency versus time, and current output to the motor versus time.
Figure 8B:
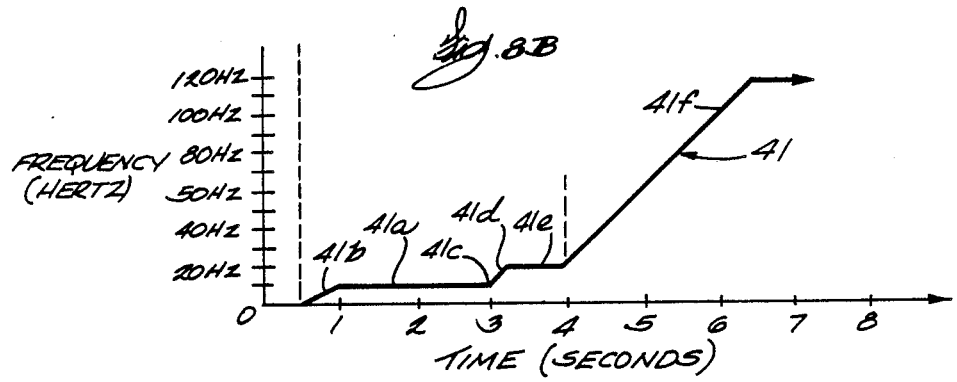

For illustrative purposes in describing the invention herein, as shown by portion 41a of curve 41 in FIG. 8B, the threshold reference frequency $F_{th}$ is selected at 10 hertz. If there is a forward or reverse direction as depicted at block 52, and the frequency $F_{out}$ increase to a value equal to or greater than the reference frequency $F_{th}$, the comparison of frequencies $F_{out}$ and $F_{th}$ will result in the operation sequence moving on to decision block 166. However, if the hoist 6 is in the increased speed operation mode and at any time the frequency $F_{out}$ becomes less than the frequency $F_{th}$, the continuing comparison of the two frequencies depicted at block 164 will result in the operation sequence looping back and the comparison depicted at block 164 being repeated. As a result, the enable output signal from block 164 to block 166 and the enable output signals resulting from the operations depicted at each of the blocks 166 through 170 will no longer take place, so that the hoist 6 will not be controlled to run in its increased speed operation mode and it will return to its normal speed operation mode.

Decision block 166 depicts the determination of whether the frequency $F_{out}$ is at a constant value by continuously comparing a present value of frequency $F_{out}$ with an immediately preceding value of frequency $F_{out}$ during a preselected time period. The determination made at block 166 may be made at any time after or while the comparison depicted at block 164 is satisfied. If the determination of block 166 is not satisfied, the operation sequence will loop back, and the determination at block 166 will be repeated. In portion 41a of curve 41 in FIG. 8B, the frequency $F_{out}$ is constant at 10 hertz and therefore the comparison depicted at block 166 is satisfied. Consequently, the determination to be made at block 168 is enabled.

Figure 8C:
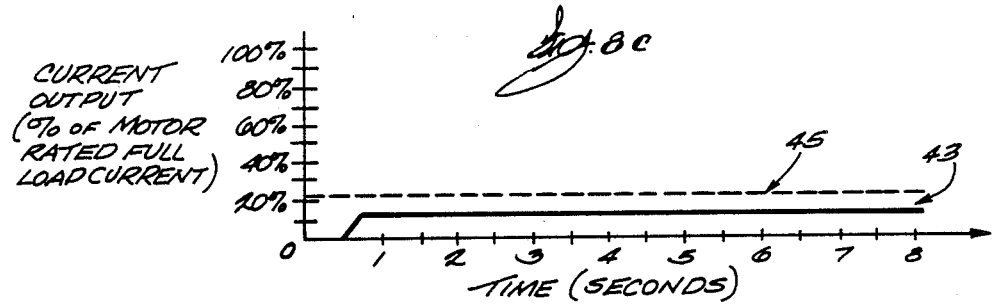

The decision block 168 depicts the comparison of a signal representative of the actual current output $I_{out}$ by the power supply on lines 22 to the motor 16, with signals representative of reference values of current output $I_{fh}$ or $I_{rh}$. The reference current values $I_{fh}$ and $I_{rh}$ respectively represent the hoist forward or raising and the hoist reverse or lowering percentages of rated full load current of the motor 16 in excess of which it is not desired to permit the hoist to operate in its increased speed operation mode. With reference to FIG. 8C, the graph illustrated represents current output to the motor 16 during a motor operation time period. The curve 43 is representative of the actual current output $I_{out}$ and the curve 45 represents one of or both (if they are equal) of the reference current values $I_{th}$ and $I_{rh}$. These reference current values are based on the relationship of the torque and corresponding current of a motor at rated full load torque at a frequency of 60 hertz. This relationship is such that the motor torque at a frequency higher than the motor's rated frequency is equal to the square of the ratio of the rated frequency to the supplied frequency multiplied by the full load rated torque. Taking as an example a supplied frequency of 120 hertz and applying the above equation, the motor produces a maximum torque at a supply frequency of 120 hertz of 25% of full load rated torque at 60 hertz. The corresponding reference current value has a maximum value of 25% of motor current at full load rated torque at a frequency of 60 hertz. This value of motor current is the level followed by curve 41 and is the maximum at which the reference currents $I_{fh}$ and $I_{rh}$ may be desirably set. In some situations, such as where load conditions are changing, it may be desirable to set the reference currents $I_{fh}$ and $I_{rh}$ at a value less than the maximum reference current and possibly set the two currents at different values.

If the comparison of the current $I_{out}$ with one of the reference current values $I_{fh}$ or $I_{rh}$ determines that $I_{out}$ is less than $I_{fh\ or\ Irh}$, depending on whether the hoist is running in a raising or lowering direction, the operation sequence will loop back and the comparison depicted at block 168 will again be made. If the current $I_{out}$ is less than or equal to the reference current values, the time delay depicted at blocks 170 and 172 is initiated. The function of the time count provided at block 170 is to eliminate "snatching" of a load. "Snatching" could occur where the load on the hoist is temporarily very light so that the hoist goes to its high speed operating mode, and the load then suddenly becomes relatively large. The hoist would attempt to snatch or lift the heavy load while operating at high speed. This situation typically may occur where a load is being lifted and there is slack in the cable 12 or in a sling used to attach the hook 14 to the load. The load "seen" by the hoist is very light while slack exists and suddenly increases when the slack is taken up.

The time count value of block 170 is provided by the EPROM 30 to the microcomputer 28, and may be preselected to a desired value, 2.0 seconds is typical. The time count is compared with the snatch time delay ST at decision block 172. Upon each count a comparison is made and if the time count is less than ST, the operation sequence moves back to the time count block 170, where the count is incremented one count and the comparison again made. When the time count value exceeds the ST time delay value, the operation sequence moves on to the steps shown at blocks 174 and 176.

Block 174 depicts increasing the actual frequency $F_{out}$ of the power supplied to the motor 16 to a preselected increased actual output frequency $F_{out\ inc}$. The frequency $F_{out\ inc}$ is equal to the requested output frequency $F_{out}$ multiplied by an increased frequency gain. The frequency gain is equal to the ratio of the maximum high frequency available from the power supply 4 to the maximum normal frequency.

With reference to FIGS. 8A, 8B and 8C, FIG. 8A illustrates a speed request curve 47 in which a portion 47a represents an initial low speed request by the operating lever 46, as previously described. At a later time, the lever 46 may be moved to request a high speed represented by the curve portion 47b. In FIG. 9B, after the brake is released as indicated at block 58 of FIG. 3A, the ramping up to 10 hertz of the frequency $F_{out}$ supplied to the motor is depicted by portion 41b of curve 41. It may be noted that the slope of curve portion 41b is at a frequency acceleration rate of zero to 60 hertz in 3.0 seconds. This is a typically normal acceleration and deceleration rate and can be considered as being a frequency acceleration/deceleration gain of 1.0. When the frequency $F_{out}$ reaches 10 hertz, it will become constant, as depicted by curve portion 41a, since 10 hertz is the requested speed. Since 10 hertz is also the reference frequency $F_{th}$, both of the comparisons indicated at blocks 164 and 166 of FIG. 3B are satisfied. With reference to FIG. 8C, the actual current $I_{out}$ is less than the reference current values $I_{th}$ ($I_{th}$), as respectively represented by curves 43 and 45, and therefore the comparison of block 168 is satisfied and the ST time delay of blocks 170 and 172 then commences. The ST time delay is shown by the length of the curve portion 41a in FIG. 8B, and at the end of the ST time delay, the speed increase to the frequency $F_{out\ inc}$ at a changed acceleration gain as depicted at block 176 takes place, beginning at point 41c on curve 41. For illustrative purposes, the changed acceleration gain is 0.5. This is a gain increase to an acceleration rate of zero to 60 hertz in 1.5 seconds and is indicated by the increased slope of portion 41d of curve 41 in FIG. 8C. Also, as represented by portion 41e of curve 41, the increased speed frequency $F_{out\ inc}$ is 20 hertz since the requested speed is 10 hertz and the frequency gain is 2.0.

The hoist 6 will operate at a raising or lowering speed corresponding to the frequency $F_{out\ inc}$ of 20 hertz until the lever 46 is moved to request the high speed as represent, for example, by curve portion 47b in FIG. 9A. In response to the high speed request, the frequency $F_{out\ inc}$ will accelerate at the acceleration gain of 60 hertz in 1.5 seconds, as depicted by curve portion 41f or curve 41, to a frequency of 120 hertz. Again the increases speed will be that corresponding to 120 hertz since the normal maximum rated frequency is 60 hertz and a frequency gain of 2.0 has been selected. Block 176 depicts changing the rate of acceleration of the actual frequency supplied to the motor 16. The acceleration rate change is typically to an increased acceleration rate and may take place simultaneously with the increased in the frequency itself.

It may be appreciated that by providing both an increased output frequency $F_{out\ inc}$ and providing a high acceleration rate from one frequency to another, the speed of the motor 16 and thereby the speed of operation of the hoist may be increased substantially and the rate of movement from a low to a high speed, or from a high to a low speed, may be quickly accomplished. Consequently, the productivity of the hoist can be significantly increased when the hook 12 is being moved without a load 20 or when a relatively light load 20 is being raised or lowered. Further, the increased speed operation and increased acceleration may be used in the operation of other motor driven devices on a crane or in any other type of equipment where the advantages of these methods would be useful.

While the hoist 6 is operating in either a forward or reverse mode, after $F_{out}$ is ramped up as depicted at block 68, a difference signal $F_{out} - N_f(N_r)$ representative of the difference between the frequency of the power supplied to the motor and the actual forward motor speed $N_f$ or the actual reverse motor speed $N_r$ is continuously compared by the microcomputer 28 with a deviation signal $D_{ms}$ representative of a speed range or window which is not to be exceeded by the motor speed, as depicted at block 68 in FIG. 3A. The deviation signal $D_{ms}$, more specifically represents a motor slip speed frequency range or window which is not to be exceeded by the motor, that is, within which the actual motor speed is to operate in order to maintain the torque necessary to avoid loss of control of the hoist load during a raising or lowering operation. The speed range represented by the signal $D_{ms}$ is selected or determined on the basis of factors described in detail hereinafter. In the comparison by the microcomputer 28 of the difference signal $F_{out} - N_f(N_r)$ with the motor speed deviations signal $D_{ms}$, as depicted at block 68 if $N_f$ or $N_r$ is within or equal to the speed range represented by signal $D_{ms}$, the operating sequence is moved on to decision block 70. At decision block 70, the microcomputer 28 determines whether the master switch 36 is in an off position end, if not, the sequence is looped back to the decision block 68 where the deviation comparison is again made. This looping and comparison is made continuously as long as the master switch is in a forward or reverse condition and the difference between the power supply frequency and the motor speed stays within the deviation range.

Considering the stopping of the hoist 6 while operating at $F_{out}$ to raise or lower the load 20, if the master switch lever 46 is moved to the off position so that neither contact F7 and R7 to the microcomputer 28 is closed, the operation sequence moves to ramp down the frequency $F_{out}$ to zero frequency and set the brake 18, as depicted at block 72. Also, upon making the deviation comparison as depicted at block 68, if the difference value of $F_{out} - N_f(N_r)$ exceeds the speed deviation range, the operating sequence moves to block 72.

As previously stated, the motor 16 may be of a type having a rated synchronous speed of 1200 rpm at 60 hertz. Typically, the rated no-load speed of the motor is approximately 1190 rpm, the speed at rated full-load torque is approximately 1165 rpm (3% slip) and the speed at maximum torque of approximately 225% to 275% of full load torque is approximately 1150 rpm. With reference to FIG. 4, torque versus speed curves for the motor 16 at various supply frequencies are illustrated, with per unit values of speed and torque designated. The motor will operate as a motor in the motor range 83 of the curves when operating in a forward direction to raise the load 20 and as a generator in the generator range 85 of the curves when operating in a reverse direction to lower the load 20 and the load is overhauling the motor 16. The curve for the 1.0 per unit value of speed in the forward direction corresponds to a 60 hertz frequency power supply and is designated by the numeral 86. The 1190 rpm, 1165 rpm and 1150 rpm operating speed points of the motor on the curve 86 are respectively designated by the numerals 88, 90 and 92. If the load 20 has a weight such that raising it requires rated full load torque at 1165 rpm with a 60 hertz power supply on lines 22, the motor 16 will operate at the 1165 rpm point 90 on the torque versus speed curve 86 of FIG. 4 during the raising operation. However, if other forces act on the host such as if the load shifts or swings, or the load is in some way impeded, or if there is a malfunction in the hoist 6, the loading of the motor may be increased to cause it to decrease speed or the malfunction of the motor may cause it to decrease speed. The motor operation will then move to a point on the line 85, possibly in the area of point 92 at maximum rated torque, having a speed value less than at operating location 90. If the increased loading of the motor requires a torque to continue raising the load beyond the maximum torque value possible at operating point 92, the motor speed will drop toward the are 94 on the curve 86. Also, if the frequency $F_{out}$ of the power supply to the motor is increased to a new frequency, e.g., 72 hertz, the motor will be operating on a new torque versus speed curve 97 in an area 99 similar to that of area 94 on the curve 86. At the areas 94 and 99 of the operating curves, the motor torque is inadequate to continue raising the load and control by the hoist 6 will be lost entirely so that the weight of the load causes rapid reversal of the load 20 and hoist 6 and dropping of the load. In this situation, when control over the load is lost, setting of the hoist brake 18 may be initiated immediately. However, if the inability of the motor to supply the increased torque is only momentary, it may be desirable to delay application of the brake until it is determined whether load control recovery is possible. This will eliminate unnecessary stopping of the hoist and consequent loss of productivity.

In the raising direction of the hoist 6 at a supply frequency $F_{out}$ or 60 hertz, referring again to FIG. 4, the maximum motor torque occurs at a slip speed of 1150 rpm which corresponds to a frequency of approximately 57.5 hertz for the motor 16. In the lowering direction of the hoist in which the load is overhauling or driving the motor 16 at a speed faster than the supply frequency of 60 hertz, the motor is actually acting as a generator and following the operating curve 98 in FIG. 4. In this case, the maximum torque occurs at point 106 on curve 98 at a speed of 1250 rpm which corresponds to a frequency of 62.5 hertz. In terms of a deviation frequency range, then, during a raising operation, the motor 16 must stay within a range of 60 to 57.5 hertz and during a lowering operation within a range of 60-62.5 hertz. In both cases, the deviation range is within 4% of the supply frequency of 60 hertz to maintain load control. If the power supply frequency is, for example, 36 hertz rather than 60 hertz, the torque versus speed curves for the motor and generator operation will respectively be curves 96 and 101. However, the motor speed range required to maintain load control, expressed in terms of frequency, will still be 2.5 hertz, but the deviation will be based on 36 hertz, i.e., 36 hertz+2.5 hertz, considering both raising and lowering operation. The percentage deviation is still 4% of 60 hertz. That the frequency range remains the same irrespective of the supply frequency at supply frequencies of 60 hertz or less can b e seen from an inspection of the curves shown in FIG. 4 which have the same amplitudes and slopes at per unit speeds of 1.0 or less. If the increase in load on the motor 16 is momentary, for example, because an impediment to raising the load 20 is temporary, it may be possible for the motor to increase its speed and recover control of the load if the deviation of the load increase is sufficiently short. Thus, in addition to comparing the speed of the motor 16 with a deviation frequency value or range, the time period that the motor speed remains outside of the deviation range may also be monitored. The holding operating of the brake is then not initiated until the deviation time is such that it would be unlikely for the motor 16 to again gain control over the load.

Figure 6:
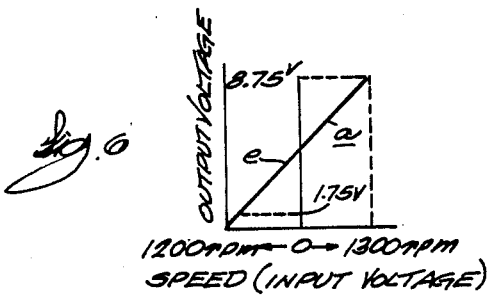
FIG. 6 is a graph of the input versus output signal characteristic of the signal converter shown in FIGS. 1 and 2.

The speed deviation detection is accomplished, with reference to FIGS. 1-3A, by the sue of the tachometer generator 38 which produces a d.c. voltage signal proportional in amplitude to the rpm of the motor 16. The polarity of the d.c. voltage signal from the generator 38 is indicative of the rotation direction of the motor 16 and thus whether the hoist 6 is raising or lowering the load 20. The d.c. voltage from the generator 38 is applied to the variable resistor RE4 which is adjustable to provide a suitable voltage signal level on line 100 to the signal converter 8. The signal converter 8 converts the input voltage signal on line 100 to a signal value d within a high positive signal range proportional to motor rpm in a first rotational direction and to a signal value e within a low positive signal range proportional to motor rpm in an opposite second rotational direction. The signal values d and e are shown in the graph of FIG. 6 and may, for example have respective values of 5.0 to 8.75 volts representing 100% of motor speed in a forward direction and 1.25 to 5.0 volts representing 100 % of motor speed in a reverse direction. The signal d within its range may represent a forward or raising motor speed of 0 to 1200 rpm increasing in the positive voltage direction and the signal e within its range may represent a reverse or lowering motor speed of 0 to 1200 rpm increasing in the decreasing voltage direction. Also, increasing or decreasing values of signal d or e within their respective voltage ranges is indicative of an accelerating or decelerating motor speed. The signal converter 8 produces an output signal on lines 102 to the microcomputer 28 which is representative of either the signal d in the high signal range or the signal e in the low signal range and whether these values are varying and thus representative of the speed, direction of rotation and accelerating or decelerating mode of the motor 16.

A s previously described, the microcomputer 28 receives from the inverter 26 a signal representative of the frequency $F_{out}$. The EPROM 30 provides to the microcomputer 28 a signal representative of a predetermined motor speed deviation range. The microcomputer 28 is programmable to select from the EPROM 30 the range or value including a different deviation value for a number of different operating modes of the motor 16.

The time that the motor speed may deviate outside of the frequency range or in excess of the frequency value may also be predetermined. Such time period is generally selected on the basis of the time within which the motor speed may be expected to return to within the desired speed deviation range. Similarly to the speed deviation value, the microcomputer 28 is programmable to select from the EPROM 30 the desired deviation time period including a different time period for different operating modes of the motor.

Referring again to the operations depicted at decision blocks 68 and 70 of FIG. 3A, if the comparison depicted by block 68 determines that the motor speed is within the deviation range, the operation sequence moves to block 70, as previously discussed. On the other hand, if the alternate embodiment of the invention shown in FIG. 5 is utilized, and the deviation comparison results in the determination that the motor speed has exceeded the speed deviation range, the operation sequence moves to block 102. At block 102, the initiation of a count for the actual time period of the $N_f$ on $N_r$ speed deviation outside of the deviation range is indicated. At the decision block 104, the count provided at block 102 is compared with the predetermined allowable speed deviation time period and if the time period has not yet been exceeded the operation sequence loops back to again compare the difference between frequency $F_{out}$ and the actual motor speed $N_f$ or $N_r$ with the predetermined motor speed deviation. If the comparison at block 68 is again negative, the operation sequence moves again to the time count block 102, and comparison block 104. This looping and comparison sequence will continue if the motor speed $N_f$ and $N_r$ does not return to within the permitted speed deviation range until the speed deviation time count exceeds the permitted time period. At that point, the operation sequence will move onward to block 72 to initiate a brake hold operation. If the difference between frequency $F_{out}$ and $N_f$ or $N_r$ returns to within or not in excess of the deviation value before the speed deviation time period is exceeded, the operation sequence will not move to the block 78 but will rather move from block 68 to block 70, as shown in FIG. 3A, where the forward or reverse position of the master switch 36 is again determined.

Figure 7A:
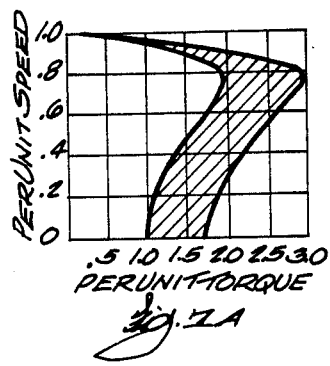
FIGS. 7A and 7B are graphs of speed versus torque curves of motors which may be used with the invention disclosed herein.
Figure 7B:
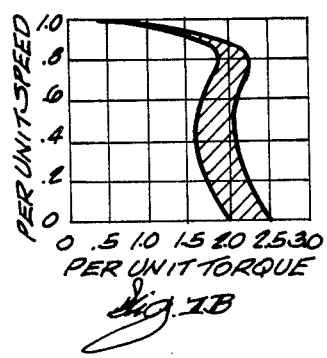

There are a number of factors which determine the torque which the motor 16 can produce and thereby the motor speed ranges within which the motor must operate. One of these factors is the speed versus torque characteristic of the motor. FIGS. 7A and 7B respectively illustrate speed versus torque curves for different sizes of NEMA Design B and NEMA Design C motors. The slopes of the speed versus torque curves for the two different types of motors in the region above 20 percent slip differ considerably for motors of the same size. Thus, the maximum torque, rated full load torque and no-load torque occur at different speeds for different motor designs and therefore the motor speed deviation values for controlling the operation of the hoist also differ. The greater amount of torque available with larger motors for a given load makes it possible to permit a motor to operate for a longer period of deviation time outside of the selected motor speed deviation since, with the additional torque, the motor is more capable of regaining control over the load. The inertia of the hoist system and the load inertia are also important factors. In the lowering direction of the hoist, both of these inertias tend to maintain downward movement, whereas, in the raising direction, the hoist system inertia tends to maintain raising movement while the load inertia is acting in a lowering direction at the time that the motor speed drops below the desired speed deviation range. The friction of the system and the motor windage are factors which tends to assist in stopping movement of the motor. Load inertia and system inertia particularly affect hoist lowering operations in either a decelerating or accelerating mode. For example, when it is desired to decelerate the load while lowering it, the motor speed will be decreased. However, the inertia of the hoist system will tend to keep the motor rotating at a faster speed. Also, the weight of the load will add to the inertia in a downward direction so that when the load is also being moved downwardly, the load inertia exerts a strong affect in maintaining the downward movement. Normally, during a lowering operating of a load 20 within the rated capacity of the hoist 6, if the motor increases to a speed in excess of its maximum torque speed, it will slow down to its rated maximum torque speed and develop the torque necessary to decelerate the load as directed within the permitted speed deviation time. In an accelerating lowering operation, the inertia of the load may tend to initially rotate the motor at a higher speed than that which a required for steady state operation. At this time, operation is outside of the predetermined speed deviation range. However, the slip frequency will decrease to within the permitted deviation range provided the capacity of both the inverter 26 and motor 6 are sufficient to permit development of the additional torque required to regain control of the lowering load.

Another important factor affecting motor torque and speed deviation and deviation time, which is not directly related to the motor or hoist system, is the response capability of the adjustable frequency power supply 4. A critical operation point of the inverter 26 occurs when the hoist direction is reversed. If the inverter 26 will not respond sufficiently quickly to reverse the polarity of the supply frequency, there will be a relatively large deviation time during which the motor speed is in excess of the desired value of deviation. A further power supply response factor is the current supply capacity of the inverter 26. The inverter desirably should be sized to provide more than the amount of current necessary for the motor to provide its full load rated torque at start-up, desirably 125% or more of rated torque, and follow its specified speed versus torque and speed versus current operating characteristics.

It may be appreciated from the foregoing discussion of the various factors which affect motor speed deviation that it is desirable to compare the difference between power supply frequency $F_{out}$ and the speed $N_f$ or $N_r$ of the motor 6 with values of motor speed deviation that differ depending on whether the motor 6 is raising the load or lowering the load and whether the raising or lowering operating is at a steady state or is in a deceleration or acceleration state. Thus, when the hoist is operating in a raising or lowering direction, in a steady state mode, it may be satisfactory to select the motor speed deviation range at values corresponding to the rated full load torque of the motor and select speed deviation time periods at relatively small values. When operating in a raising direction, in either an accelerating or decelerating mode, a number of the factors discussed above may have a greater affect on the ability of the motor to control the load, and it therefore may be desirable to set the motor speed deviation at a greater value, possibly corresponding to the motor speed for maximum rated torque. It may also be desirable to increase the deviation time period to eliminate unnecessary application of the brake 18. On the other hand, it may be considered more desirable to decrease the deviation time period to assure protection against loss of the load in difficult duty operations. During lowering operation of the hoist, in either a decelerating or accelerating mode, where high inertia of the load and hoist system is a major factor, it may be desirable to select the speed deviation range such that the speed increases to near the value for maximum rated torque if the increased torque produced will control the load. The deviation time period may be selected such that it will permit the motor a greater amount of time to decrease its speed to return within the deviation range. With this approach, unnecessary stopping of the hoist operation will be avoided. On the other hand, if it is felt that it is more important to absolutely assure that the load will not drop at a speed beyond which it can no longer be controlled by the motor, it may be desirable to select the deviation time period at a relatively small value to maintain load control. The following hoist operating table lists motor operation conditions and values of motor speed deviation and deviation times which are considered to be suitable for a NEMA Class B motor of 10 to 200 horsepower, operating at a frequency of up to 60 hertz.

Hoist Operating Table

| Direction | State | $F_{omax}$, % of Synchronous Speed | $F_{omin}$, % of Synchronous Speed | Deviation Time |
|---|---|---|---|---|
| Raising | Steady | — | 3% | 0.3 second |
| Lowering | Steady | 3% | — | 0.3 second |
| Raising | Accelerating/Decelerating | 5% | 5% | 0.3 second |
| Lowering | Accelerating/Decelerating | 7% | 7% | 0.3 second |

An adjustable frequency drive apparatus and method for operating an alternating current motor driven hoist has been described in which a number of different desirable capabilities are provided. These include, at the initiation of the hoist operation, the determination in a relatively simple and reliable manner of determining whether the necessary motor load holding toque is available prior to the release of the hoist brake. Upon the release of the hoist brake, during raising or lowering of a load by the hoist, the speed of the hoist motor is monitored to determine whether it is running at a desired rate relative to the frequency of the power supplied to the motor. The proper relationship of motor speed to power supply frequency is critical to maintaining hoist motor torque sufficient to control the load being hoisted. In order to avoid the serious consequences of loss of load control, both load holding torque at the initiation of hoist operation and operating torque during raising or lowering of a load are critical. A method and apparatus for detecting mechanical overload of a hoist and a method for quickly raising the motor speed to an increased speed is also provided. In addition, a method is provided for increasing the speed of the hoist automatically in response to operation of the hoist at a low load well under the rated full load torque of the hoist motor.

It will be understood that the foregoing description of the present invention is for purposes of illustration only and that the invention is susceptible to a number of modifications or changes, none of which entail any departure from the spirit and scope of the present invention as defined in the hereto appended claims.

What is claimed is:

1. In a method of controlling a hoist for raising and lowering an object, the hoist being loaded by the weight of the object and its raising or lowering, the hoist including and alternating current motor and an adjustable frequency power supply connected to and providing current to the motor, the steps comprising:

determining the value of the current level of the power supplied to the motor indicative of a predetermined mechanical overload condition of the hoist;

providing a reference signal representative of said determined current level and thereby representative of the mechanical overload condition;

sensing the actual current level of the power supplied to the motor and producing an actual current signal representative of said actual current level; and comparing the actual current signal with the reference signal and providing an overload output signal if the actual current signal equals or exceeds the reference signal.

2. In a method of controlling a hoist for raising and lowering an object, the hoist being loaded by the raising and lowering of the object and including an alternating current motor and an adjustable frequency power supply connected to and providing current to the motor, the steps comprising:

determining the value of first and second current levels of the power supplied to the motor with each being indicative of a predetermined mechanical overload condition of the hoist while respectively raising the object and lowering the object;

providing a first reference signal representative of the first current level indicative of the mechanical overload condition of the hoist while raising the object and a second reference signal representative of the second current level indicative of the mechanical overload condition of the hoist while lowering the object;

sensing the current level of the power supplied to the motor and producing an actual current signal representative of said current level;

determining whether the hoist is raising or lowering the object and producing either a raising signal or a lowering signal corresponding to the raising or lowering operation of the hoist;

comparing the actual current signal with the first reference signal in response to the raising signal and comparing the actual current signal with the second reference signal in response to a lowering signal; and providing an overload output signal if the actual current signal equals or exceeds the first reference signal or the second reference signal with which the actual current signal is compared.

3. In a method of controlling a hoist for raising and lowering an object, the hoist being loaded by the weight of the object and its raising or lowering, the hoist including an alternating current motor and an adjustable frequency power supply connected to and providing current to the motor, the steps comprising:

determining whether the motor is in a constant speed condition and, if so, producing a constant speed signal indicative of the constant speed condition;

determining the value of the current level of the power supplied to the motor indicative of a predetermined mechanical overload condition of the hoist;

providing a reference signal representative of said determined current level and thereby representative of the mechanical overload condition;

sensing the actual current level of the power supplied to the motor and producing an actual current signal representative of said actual current level; and comparing the actual current signal with the reference signal in response to the constant speed signal and providing an overload output signal if the actual current signal equals or exceeds the reference signal.

4. In a method of controlling a hoist for raising and lowering an object, the hoist being loaded by the raising and lowering of the object and including an alternating current motor and an adjustable frequency power supply connected to the motor, the steps comprising:

determining whether the motor is in a constant speed condition and, if so, producing a constant speed signal indicative of the constant speed condition;

determining the value of first and second current levels of the power supplied to the motor with each being indicative of a predetermined mechanical overload condition of the hoist while respectively raising the object and lowering the object;

providing a first reference signal representative of the first current level indicative of the mechanical overload condition of the hoist while raising the object and a second reference signal representative of the second current level indicative of the mechanical overload condition of the hoist while lowering the object;

sensing the current level of the power supplied to the motor and producing an actual current signal representative of said current level;

determining whether the hoist is raising or lowering the object and producing either a raising signal or a lowering signal corresponding to the raising or lowering operation of the hoist;

comparing the actual current signal with the first reference signal in response to the constant speed signal and to a raising signal and comparing the actual current signal with the second reference signal in response to the constant speed signal and to a lowering signal; and providing an overload output signal if the actual current signal equals or exceeds the first reference signal or the second reference signal with which the actual current signal is compared.

5. The method according to claim 3 or 4 wherein the step of determining whether the motor is in a constant speed condition is accomplished by sensing whether the value of the frequency of the power supplied to the motor by the adjustable frequency power supply is constant.

6. The method according to claim 5 further comprising the step of, following the comparison of the actual current signal with the reference signal, delaying the overload output signal if the actual current signal equals or exceeds the reference signal or a preselected time period to permit the hoist to recover from a temporary mechanical overload condition.

7. The method according to claim 6 further comprising the step of disabling the operation of the hoist in the raising direction in response to the output signal.

8. In a method of controlling a hoist for raising and lowering an object, the hoist being loaded by the weight of the object and its raising or lowering, the hoist including an alternating current motor and an adjustable frequency power supply connected to the motor, the steps comprising:

supplying power from the adjustable frequency power supply to the motor at a frequency having a constant value;

changing the frequency of the power supplied to the motor from said constant value frequency to a frequency of a different value;

sensing whether the frequency supplied by the power supply is changing or is at a constant value and producing a constant frequency signal if the frequency is at a constant value;

comparing a current supply signal representative of the level of the actual current of the power supplied to the motor with an overload current signal representative of a reference value of motor current indicative of a mechanical overload of the hoist in response to the constant frequency signal; and providing an output signal if the current supply signal is equal to or greater than the overload current signal.

9. The method according to claim 6 comprising the further step of delaying for a preselected time period the provision of the output signal when the comparison step indicates the current supply signal is equal to or greater than the overload current signal.

10. A hoist for raising and lowering an object, the hoist being loaded by the object and including a motor and an adjustable frequency power supply for supplying power to the motor, the combination comprising:

measuring means coupled to the adjustable frequency power supply for measuring the motor current level of the power supplied to the motor and producing and actual current signal representative of the measured motor current level;

overload reference means for providing a reference signal representative of a motor current level indicative of a mechanical overload condition of the hoist; and means for comparing the actual current signal with the reference signal and producing an output signal if the actual current signal equals or exceeds the reference signal whereby a mechanical overload condition of the hoist is indicated.

11. The hoist according to claim 10 further comprising:

first sensing means for sensing the frequency of the power supplied to the motor and producing a signal representative of the frequency value;

second sensing means for sensing whether the frequency value is constant and producing a constant frequency value signal when the value is constant; and the means for comparing the actual current signal with the reference signal is responsive to the constant frequency value signal to make the comparison.

12. In a method of controlling a hoist for raising and lowering an object, the hoist being loaded by the weight of the object and its raising or lowering, the hoist including an alternating current motor and an adjustable frequency power supply connected to the motor, the steps comprising:

sensing the value of the frequency supplied by the power supply to the motor and providing a first indication when the frequency is constant;

comparing the value of the supplied frequency with a preselected low frequency in response to the first indication ad providing a second indication if the supplied frequency is equal to or less than the low frequency and a third indication if the supplied frequency is greater than the low frequency;

providing a first reference signal representative of a motor current indicative of a hoist mechanical overload at a motor speed corresponding to a frequency at or less than said low frequency in response to the second indication;

providing a second reference signal representative of a motor current indicative of a hoist mechanical overload a a motor speed corresponding to a frequency greater than said low frequency in response to the third indication;

sensing the current level of the power supplied to the motor and producing an actual current signal representative of said current level; and comparing the actual current signal with the one of the first and second reference signals respectively provided in response to the second and third indications and providing an output signal if the actual current signal equals or exceeds the reference signal with which the actual current signal is compared.

* * * * *